United States Patent [19]

Tidy, Jr.

[11] 4,125,121
[45] Nov. 14, 1978

[54] CLEANING TOOL FOR POULTRY WATERING SYSTEMS

[76] Inventor: Mial R. Tidy, Jr., Rte. 3, Box 271, Siler City, N.C. 27344

[21] Appl. No.: 824,359

[22] Filed: Aug. 15, 1977

[51] Int. Cl.² .......................... B08B 3/02; B08B 9/02
[52] U.S. Cl. ................................. 134/167 C; 119/81
[58] Field of Search ......... 119/81; 134/167 C, 168 C, 134/166 C, 169 C, 22 C, 24, 198

[56] References Cited

U.S. PATENT DOCUMENTS

| | | | |
|---|---|---|---|
| 1,704,364 | 3/1929 | Markley | 134/168 C X |
| 1,807,114 | 5/1931 | Wright et al. | 134/198 X |
| 1,988,198 | 1/1935 | German | 134/167 C X |
| 3,034,481 | 5/1962 | Godshalk | 119/81 |

Primary Examiner—Robert L. Bleutge

[57] ABSTRACT

The water supply line to an automatic poultry watering system is disconnected from the metering housing, and a flushing implement is attached to the free end of the supply line. The flushing implement includes an upper end attachable to the supply line approximately equal in diameter to the supply line and a relatively small nozzle member at the other or free end which is considerably reduced in both outer and inner diameter. The flow of water is thus greatly accelerated, and the implement is used to probe the inlet and into the metering housing to flush out any debris or loose material that may become lodged therein clogging up the operation of the metering housing or valve.

2 Claims, 3 Drawing Figures

CLEANING TOOL FOR POULTRY WATERING SYSTEMS

BACKGROUND OF THE INVENTION

As the poultry industry, and particularly the growing of chickens has evolved, various automatic feeding and watering devices have developed whereby the chickens are fed and watered by means of automatic systems rather than manually by the chicken producer as was formerly the practice. Automatic watering systems have developed along the lines of U.S. Letters Pat. Nos. 3,034,481 and 3,108,573. In such systems a watering trough is suspended from the roof or attached at one end to a standard with the other end being loosely received by and operatively connected to what will be referred to in this application as a "metering housing". In such a metering housing, the free end of the trough is held, and includes a valve which operates responsive to the weight of the water in the trough to turn on and off the incoming supply of water. When the trough is relatively empty, and therefore light, the valve opens letting fresh water into the trough. When the trough has been filled to a desired level and weight, the weight of the water in the trough will activate the valve to close it, thereby shutting off the supply of water. In another system a circular pan is suspended and water automatically metered thereinto through a similar valve set-up.

Various systems have been developed to be used in conjunction with such automatic watering systems to automatically, periodically flush out the trough as it becomes dirty as a result of chickens perching on the edges of the trough, walking through the trough, and because of other contaminating habits and conditions. Such trough cleaning apparatuses and methods are described and illustrated in U.S. Letters Pat. No. 3,150,638; 2,865,328; and 3,292,588. While trough cleaning is a desirable result to be achieved because otherwise it may lead to poultry sickness or mortality, another problem exists in the aforedescribed automatic watering systems which, to the knowledge of applicant has not been solved.

This problem is the periodic flushing of the valve or metering housing through which the water passes on its way to the trough. Generally, there is provided an upper port into which the water is initially delivered, and usually, but not always, there is provided a small screen or filtering mechanism in the path of the water through the housing. The upper port collects and prevents debris which may be present in the supply line from entering into the trough in the first place. Periodically the upper port and screen, if used, of such metering housings or the valves therein have to be cleaned because loose debris and material becomes deposited within the mesh wire of this screen, thereby slowing and eventually shutting off the supply of water. Such cleaning procedures are now very time consuming since the valves have to be completely disassembled, cleaned, then reassembled. Coupled with the number of water systems on a poultry grower's farm, the problem may even be accentuated.

SUMMARY OF THE PRESENT INVENTION

In accordance with the present invention, however, a specially designed cleaning implement is provided which may be attached to the free end of the supply line, once it is disconnected from the metering housing. This instrument serves two purposes in that it greatly accelerates the flow of water to a speed which will flush out the housing, and also includes a probe or point which may be inserted into the housing or valve in the area of the aforementioned screen or upper port. The water pressure obtained by the constriction or reduced diameter of the cleaning implement is then sufficient to flush out the port and screen including all loose debris and impediments. This eliminates the necessity of disassembling, cleaning, and re-assembling the valves and saves a considerable amount of time with an equally acceptable result.

As far as the implement itself is concerned, there is provided an elongated tubular member having an upper or first end and a lower or second end. The upper or first end is of an inner diameter approximately the same as the supply line and includes a means for releasably attaching the implement thereto. For example, the supply line is generally, but not necessarily a rubber conduit which may be merely slipped off a nipple on the supply housing. The tool is then inserted into the conduit and is of such size and diameter as to be held thereby. The inner diameter of the upper portion of the implement is approximately the same as the effective diameter of the supply line.

The lower or second end of the implement is greatly reduced in both outer and inner diameter. The outer diameter, which may include brush bristles, is reduced so that the tool may be easily inserted into the opening within the metering housing through which the water enters. The inner diameter is correspondingly reduced so that the speed of the water therethrough is greatly increased to effect a flushing effect in the upper port of the conduit in the metering housing.

It is therefore one object of the present invention to provide a cleaning implement for the valve housings of poultry watering systems which may be easily and effectively utilized.

It is another object of the present invention to provide a cleaning tool for poultry watering systems of the type described in which the cleaning tool of the present invention is releasably attached to the water supply line, then utilized to flush and scrub out the metering housing and inlet valve.

It is a further object of the present invention to provide a tool for cleaning the metering housing and inlet valve of automatic poultry watering systems without requiring disassembly thereof.

Other objects and a fuller understanding of the present invention will become apparent from reading the following detailed disclosure of the preferred embodiment in conjunction with the accompanying drawings in which.

DETAILED DESCRIPTION OF A PREFERRED EMBODIMENT

Figure 1:
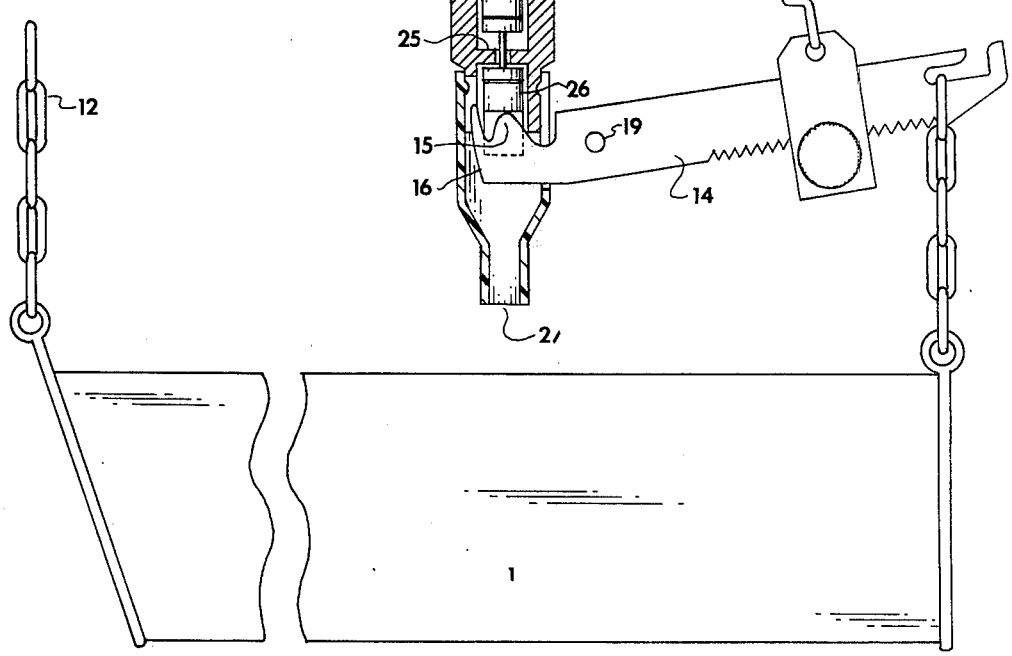
FIG. 1 is a schematic representation, with some parts in section, of an automatic watering system illustrating the supply line removed from the metering housing, and the tool according to the present invention inserted into the housing, but not yet attached to the supply line.

Turning now to the drawings, and particularly to FIG. 1, there is illustrated the tool according to the present invention in the general environment for which it is adapted. In general, automatic watering systems for poultry houses, as developed to this time, include a reservoir, such as, for example, the V-shaped trough 10 suspended at one end from a chain 12. The opposite end of trough 10 is suspended from some type of spring 18 so that as the water level in the trough rises and falls, the trough itself is caused to tilt upwardly and downwardly due to the variations in downward force on spring 18. An operating bar 14 is connected at one end to either spring 18 or the bracket 17 by means of which the trough is suspended from spring 18. Further, the operating bar 14 has the other end 16 thereof connected to a metering housing 20 as conventional and described herebelow. The operating bar 14 is centrally pivoted about a pivot pin 19 so that as the trough lowers, as when full of water, the right hand end of operating bar 14 lowers and the other end 16 raises. When the water level drops the opposite effect occurs.

Also, stationarily mounted separately from said operating bar is a metering housing 20 which includes a conduit or a pathway for water from an upper end to a lower end into the trough 10. Water is introduced from a supply line 28 which is normally secured to the upper end of the metering housing 20 from which water is introduced to an upper port 22. A filter screen 24 is generally provided which filters loose impediments and debris from the entering water. The water continues down through a constriction 25 which is selectively opened and closed by valve 26, and down through the lower opening 27 of the metering housing 20. Where no screen is used debris still collects above valve 26 in the upper port 22.

Operating bar 14 extends through a slot in the wall of metering housing 20 and includes a protrusion 15, which bears against the valve 26. As the operating lever or bar 14 is caused to move upwardly and downwardly, valve 26 is thus moved upwardly and downwardly into contact with valve seat or constriction 25 thereby opening and closing the valve and turning on or off the flow of water therethrough. The aforementioned structure is conventional, and is not the invention described herein, only the background.

The problem with this system, and with which the present invention is concerned arises in the upper port 22 or at screen 24. Raw water will normally include some loose impediments or materials which get caught at this point. After a period of time, these loose impediments will fill up the interstices or screen openings to such an extent that the flow of water therethrough is stopped or seriously impeded. It is normal practice at the present time for the chicken growers to then either disassemble the valve, take the screen out if one is present, clean the valve and screen, and then reassemble it; or else to follow the easier course of action which is to throw away the old valve and replace it with a new one. Either of these courses of action is time consuming and/or expensive.

Figure 2:
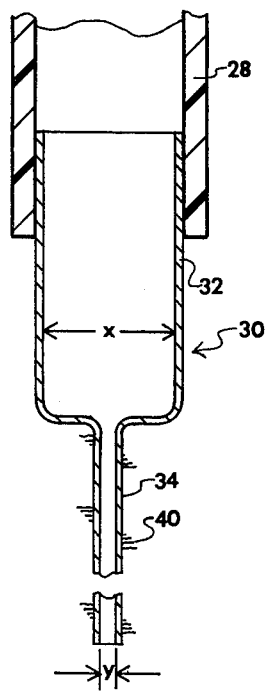
FIG. 2 is an enlarged sectional view, with parts broken away, illustrating the manner in which the tool is attached to the supply line and illustrating the relative size thereof.

As best illustrated in FIG. 2, the cleaning or flushing implement 30 itself includes an elongated tubular member having a first end 32 and a second end 34, and preferably, but not necessarily, formed of a relatively thin walled metallic material. The first or upper end 32 has an outer diameter substantially equal to or slightly greater than the inner diameter of conduit 28. Therefore, when the conduit 28 is removed from the nipple of housing 20, the upper end 32 of the tool 30 may be inserted thereinto and is held securely therein by means of a friction fit. The inner diameter $x$ is substantially the same as the inner diameter of conduit 28 although it is easily recognized that it will have to be slightly smaller, due to the thickness of the wall of the tubular member 30.

Figure 3:
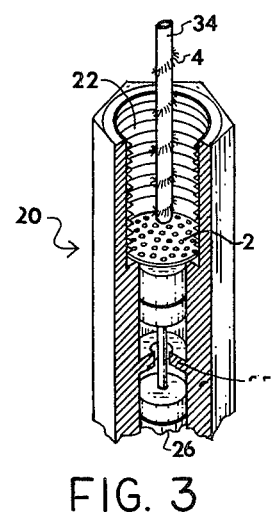
FIG. 3 is an enlarged perspective view, partly in section, illustrating the interior of a portion of the metering housing, with the cleaning tool of the present invention inserted therein, and the manner in which it is effectively applied to scrub and flush the upper port and surface of the filter screen therein.

The second or lower end 34 of the tool 30 includes a substantially reduced outer and inner diameter, providing a cross-sectional area on the order of one-third or less of the cross-sectional area of the upper end. The outer diameter is greatly reduced, so that the tool may be inserted into the opening 22 in metering housing 20 as illustrated in FIG. 3, and cleaning of the screen 24 may be easily accomplished. The reduction in the inner diameter $y$ is for the purpose of substantially increasing the velocity of the water therethrough so that the lower end 34, when inserted into the port 22, acts as a nozzle or means for accelerating the water against the surface of screen 24, thereby loosening the impediments and flushing therefrom. If desired, the lower end 34 of the tool may be provided with brush bristles 40, however, they are not critical or necessary to the operation.

The relative lengths of said upper and lower sections is not critical, as long as the upper section length is sufficient to secure the tool to the supply line, and the lower section length is sufficient to move the outlet end of the tool into close proximity to the screen.

While a preferred embodiment of the present invention has been shown and described hereinabove, it is obvious that various changes might be made without departing from the scope of the invention. For example, rather than inserting the upper end of the tool 30 into a flexible conduit, there might be other types of connecting means provided, such as a screw-like coupling as is used on garden hoses, quick-release attachment means, or other coupling devices. Generally, however, such poultry watering systems utilize a flexible rubber-like conduit which is most easily connected to by means of a force-type fit as illustrated hereinabove. Also, the material from which the material is made is not necessarily metal, although metal is preferred for reasons of durability, strength, and the like. Further, the ratio of the diameters may vary considerably, it being realized that the main consideration is that the lower end be reduced in diameter to such an extent that the velocity of the water is increased substantially, and the diameter thereof is decreased substantially to allow the working end of the tool to be inserted within the chamber 22 in metering housing 20.

Other changes may also be possible without departing from the scope of the present invention, which is set forth in the claims hereinbelow.

What is claimed is:

1. A cleaning tool for poultry watering systems of the type including a reservoir to which water is supplied by means of a valve in a metering housing, which selectively meters water from a supply line into said reservoir, and wherein said metering housing includes an upper port into which the water is delivered, which periodically becomes clogged, said cleaning tool comprising:

(a) an elongated tubular member having a first end and a second end;

(b) said first end having means associated therewith for quickly attaching said tool to said supply line at such times as when said supply line is disconnected from said valve body;
(c) said first end having an effective inner diameter substantially equal to the inner diameter of said supply line;
(d) said second end having a substantially reduced outer and inner diameter, said outer diameter being reduced to such an extent that said second end may be inserted within the opening in said metering housing through which said water passes and easily moved around therein, and said inner diameter being reduced to such an extent that the water pressure from said supply is increased substantially to enable flushing debris and deposits therein backwardly out of said metering housing.

2. The cleaning tool according to claim 1 wherein the cross-sectional area of said second end is no greater than one-third of the corresponding cross-sectional area of said first end.

* * * * *